No. 852,295. PATENTED APR. 30, 1907.
R. H. PURNELL.
COTTON CULTIVATOR.
APPLICATION FILED OCT. 16, 1906.
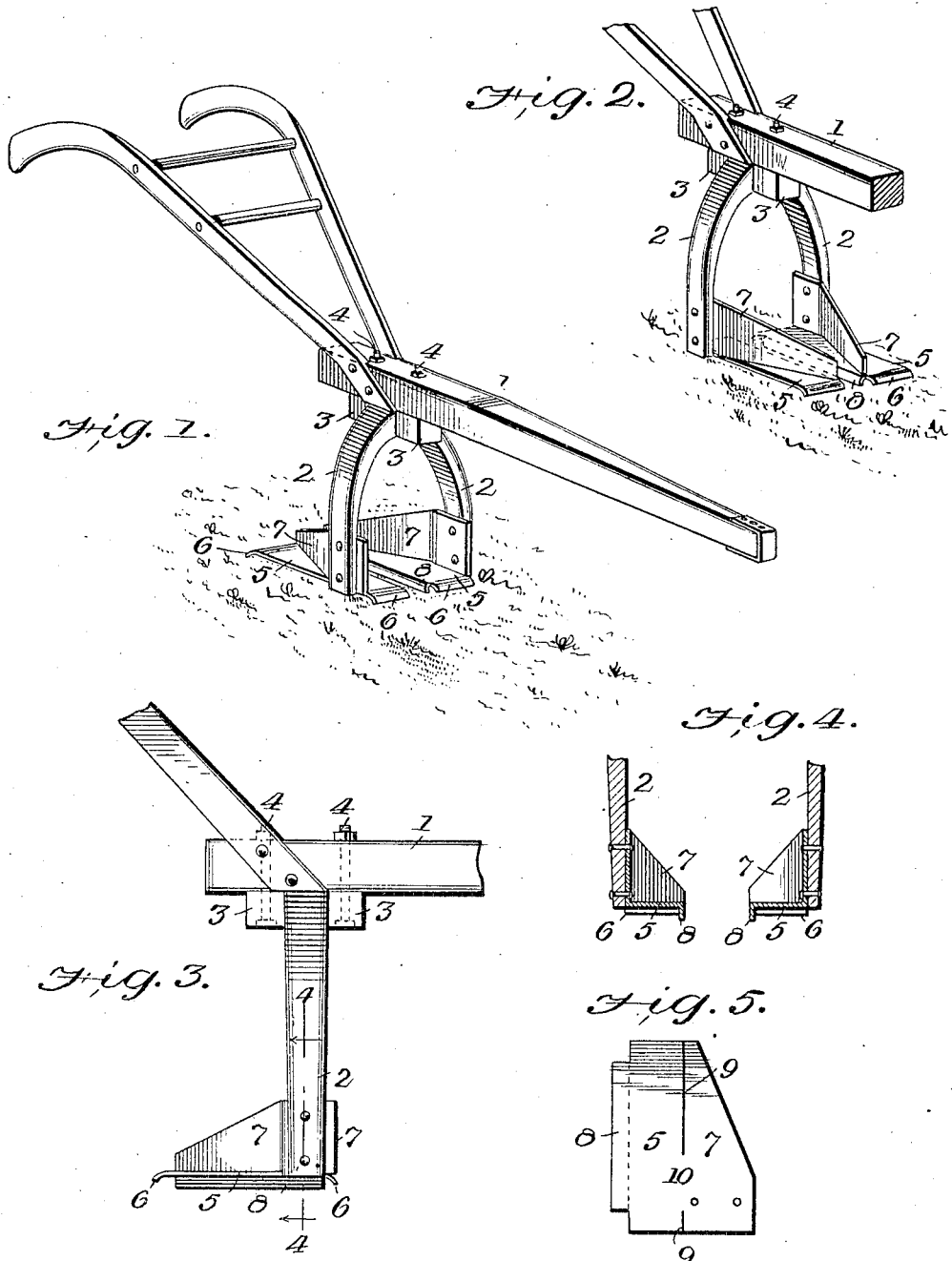
WITNESSES
F. C. Barry
Amos W. Hart
INVENTOR
RICHARD H. PURNELL
BY Munn & Co
ATTORNEYS

UNITED STATES PATENT OFFICE.

RICHARD HOPE PURNELL, OF ROSEDALE, MISSISSIPPI.

COTTON-CULTIVATOR.

No. 852,295.  Specification of Letters Patent.  Patented April 30, 1907.

Application filed October 16, 1906. Serial No. 339,258.

*To all whom it may concern:*

Be it known that I, RICHARD HOPE PURNELL, a citizen of the United States, and a resident of Rosedale, in the county of Bolivar and State of Mississippi, have invented an Improved Cotton-Cultivator, of which the following is a specification.

My invention is a cotton cultivator of simple and inexpensive construction and in which the cultivator devices proper are adapted for reversal on a beam so that the implement may be used for scraping the sides of a cotton row or for ridging the same by throwing dirt toward the plants, as conditions may require.

The details of construction, arrangement and operation of the invention are as hereinafter described and illustrated in the accompanying drawings, in which Figure 1 is a perspective view of my invention attached to a plow or cultivator beam. Fig. 2 is a perspective view of the same parts showing the cultivating devices proper reversed in position. Fig. 3 is a side view of the invention. Fig. 4 is a vertical section on the line 4—4 of Fig. 3. Fig. 5 is a plan view of the metal blank from which either of the cultivating devices proper is formed.

1 indicates a beam which is provided with guiding handles in a well known manner, and 2 indicates standards connected with a block, or bar, 3 that is detachably secured to the beam by screw-bolts 4. These standards curve or extend laterally, and the cultivating devices proper are secured to their lower ends, a sufficient space being left between them for the passage of the cotton plants. The standards and block 3 are preferably constructed integral. Each of the cultivating devices—which are duplicates—is composed of a horizontal plate 5, which serves in practice as a mold-board or scraper, and a vertical plate 7, which extends over the said plates 5 at an inclination of about 45°. The plates 7 are sloped or inclined on the upper edge and their broader ends, which are parallel to the edges of the plates 5, are secured by bolts or rivets to the inner sides of the standards 2. The inner edges of the mold-boards or scrapers 5 are provided with a longitudinal, pendent flange 8 which serves as a guide, and practically as a land-side, in the operation of the implement.

When the implement is to be used as a ridger, or for throwing dirt toward the growing plants, the arrangement is as shown in Fig. 1. That is to say, the parts 5—7 are arranged so as to project rearward from the standards, or in other words so that the parts 7 incline toward each other. Thus, as the cultivator is drawn forward the front downwardly-curved ends 6 of the plates 5 take into the soil on each side of the ridge in which the growing plants stand, and the dirt taken up by them passes backward on the said plates 5 and is forced inward by the vertical plates 7 and up to, or into proximity to, the plants. On the other hand, if the cultivating devices be reversed on the beam, as indicated in Fig. 2, the implement is adapted for scraping or removing soil from the sides of the ridge, since, in such case the soil taken up by the plates 5 is diverted laterally by the plates 7, which separate more widely as they extend backward to the standards 2. While it would be practicable to detach the cultivating devices proper from the standards and reverse them in position, the reversal is more easily and expeditiously effected by removing the bolts 4 from the beam and simply reversing the entire attachment composed of the standards 2, block 3, and the cultivating devices proper. I thus provide a single implement or cultivator whose working parts may be easily and expeditiously reversed according as it is desired to throw dirt toward the plants or remove it from the sides of the ridge.

I preferably form each cultivating device proper from a single metal blank of sheet steel or other preferred metal, the same having the form indicated in Fig. 5, and provided with cuts or slits 9 which are alined but do not extend entirely through the blank longitudinally. The portion 10 which intervenes the cuts 9 serves as a means of connection between the parts 5 and 7, when the latter is bent up and inclined laterally, as indicated in Figs. 1 and 2.

What I claim is—

1. A cotton-cultivating implement adapted for ridging or scraping cotton rows, the same comprising a beam, standards which are secured thereto detachably and adapted for reversal, and cultivating devices proper, each comprising a horizontal plate having its ends curved downwardly and a vertical plate arranged on the first-named one and lying at a horizontal angle thereto, substantially as described.

2. The improved cotton-cultivating implement, comprising a beam, standards secured thereto, and cultivating devices proper attached to the standards and arranged in duplicate but separated by a space sufficing for the passage of the cotton plants, the two devices being each composed of a horizontal plate and a vertical plate arranged thereon and inclined from the standards at a horizontal angle, substantially as described.

3. In a cotton cultivator, a detachable and reversible attachment for a beam, the same comprising pendent standards which diverge laterally from each other, and cultivating devices consisting of plates adapted to serve as mold-boards or scrapers, and vertical plates arranged on the former and at an inclination thereto horizontally, substantially as described.

4. In a cotton cultivator, a cultivating device proper comprising a flat plate having a downwardly-curved end and a vertical plate extending from the horizontal plate at an inclination to the axis of the latter, substantially as described.

5. In a cotton-cultivating implement, the combination, with standards, of cultivating devices proper comprising horizontal plates adapted to serve as mold-boards or scrapers, the same having their inner edges bent downwardly to form a guide, and a vertical plate arranged on the latter at a horizontal angle, as described.

6. In a cotton-cultivating implement, the combination, with standards, of cultivating devices constructed in duplicate and separated from each other by a narrow space, each comprising a horizontal plate adapted to serve as a mold-board or scraper, and a vertical plate arranged on the former at a horizontal inclination, the two plates being formed from a single blank or constructed integral, substantially as described.

7. In a cotton-cultivating implement, a reversible cultivating device proper comprising a flat plate having its ends curved downwardly and provided with a pendent side guide, and a vertical plate which lies upon the horizontal one and is inclined at a horizontal angle, substantially as described.

RICHARD HOPE PURNELL.

Witnesses:
I. S. SHAPOFF,
CHAS. CLARK.